US012594441B2

(12) United States Patent
Yeoh

(10) Patent No.: US 12,594,441 B2
(45) Date of Patent: Apr. 7, 2026

(54) FACE MASK

(71) Applicant: EMP Image Solution Sdn. Bhd., Petaling Jaya (MY)

(72) Inventor: Chee Wei Yeoh, Petaling Jaya (MY)

(73) Assignee: EMP Image Solution Sdn. Bhd., Petaling Jaya (MY)

(*) Notice: Subject to any disclaimer, the term of this patent is extended or adjusted under 35 U.S.C. 154(b) by 641 days.

(21) Appl. No.: 17/559,980

(22) Filed: Dec. 22, 2021

(65) Prior Publication Data

US 2023/0007850 A1 Jan. 12, 2023

(30) Foreign Application Priority Data

Jul. 6, 2021 (MY) ............................ PI2021003851

(51) Int. Cl.
*A62B 23/02* (2006.01)
*A41D 13/11* (2006.01)
*A62B 18/08* (2006.01)

(52) U.S. Cl.
CPC .......... *A62B 23/02* (2013.01); *A41D 13/1115* (2013.01); *A62B 18/084* (2013.01)

(58) Field of Classification Search
CPC ....... A62B 23/02; A62B 18/084; A62B 18/02; A62B 18/08; A41D 13/1115; A41D 13/113; A41D 13/1123; A41D 13/1138
See application file for complete search history.

(56) References Cited

U.S. PATENT DOCUMENTS

| | | | | |
|---|---|---|---|---|
| 2,494,406 A * | 1/1950 | Reitano | A41D 13/1161 | 128/206.13 |
| 4,635,628 A * | 1/1987 | Hubbard | B32B 27/065 | 128/201.17 |
| 5,694,925 A * | 12/1997 | Reese | A41D 13/1115 | 128/207.11 |
| 2021/0022418 A1 * | 1/2021 | Furuya | A41D 13/1115 | |

FOREIGN PATENT DOCUMENTS

KR 20180020961 A * 2/2018 ......... A41D 13/1115

OTHER PUBLICATIONS

Center for Disease Control, “How to Knot and Tuck Your Mask to Improve Fit”, Apr. 15, 2021, Center for Disease Control, https://www.youtube.com/watch?v=GzTAZDsNBe0 (Year: 2021).*

* cited by examiner

*Primary Examiner* — Kari K Rodriquez
(74) *Attorney, Agent, or Firm* — HSML P.C.

(57) ABSTRACT

A face mask for wearing over mouth and nose of a user that includes a flexible body portion and one or more fasteners attached to the body portion. The body portion substantially covers a respiratory tract opening e.g. mouth and nostrils, of the user to block an entry of undesired airborne impurities into the respiratory tract opening. When the mask is worn, a front surface of the body portion is exposed to an external atmosphere and a rear surface of the body portion comes in substantial contact with the face. The fastener holds the body portion against the face when the mask is worn.

6 Claims, 3 Drawing Sheets

FACE MASK

CROSS-REFERENCE TO RELATED APPLICATIONS

This application claims priority to Malaysian Patent Application No. PI2021003851 filed on Jul. 6, 2021, which is incorporated by reference in its entirety for all purposes.

FIELD OF THE DISCLOSURE

The present invention relates broadly to the field of personal protection equipment. More particularly, the present invention relates to a face mask for wearing over mouth and nose of a user.

BACKGROUND

Traditionally, face masks were used during surgeries to prevent infecting a patient, surgeons or assistants thereof during a surgery or while providing medical care. However, increasing pollution, evolution of new diseases and declining immunity have forced common people to use such face masks in public places to protect themselves from airborne impurities, e.g., germs and pollutants, that may potentially harm human health. Typically, a face mask is formed of a filtering medium, e.g., sheet of porous material, cut into a rectangular shape to cover the nostrils and mouth of a user, and one or more pairs of strings attached to longitudinal edges of the filtering medium for fastening the face mask over the mouth and nose of a user.

However, such face masks do not conform to a contour of the face, and therefore form wide gaps near the edges, which in turn defeats the main objective of the face mask. To address this issue, the face masks are configured in different shapes to be in conformity with the facial contour of the user. In some cases, a stiffening member e.g., wire and metallic strips, are embedded in the face mask to allow the user to adjust the shape of the face mask to prevent any gap formation around the edges of the face mask.

U.S. Pat. No. 6,584,976 B2 discloses a face mask with a mask body configured in a cup-shape so as to fully cover a person's nose and mouth when worn. Even though this configuration covers entire nose and mouth without any gap, it is very difficult to manufacture and store due to its 3-dimensional shape.

United States Patent Publication No.: US 2009/0255542 A1 discloses a face mask comprising a mask body and a nose clip attached to an upper edge of the mask body, wherein the nose clip has a 3-dimensional deformation capability to conform to a nose contour of a wearer and also can retain the deformed shape for a long time. The mask body has a plurality of pleated regions extending between longitudinal edges of the mask, wherein the pleated regions are configured to be folded flat during storage of the mask and to be spread vertically to form a desired space between the mask body and mouth of the user. This configuration simplifies bulk manufacture and storage of the mask.

A conventional pleated face mask (100) is shown in FIG. 5, wherein the face mask is formed of a sheet of fabric with a plurality of pleated regions (101) and stitched around the edges, so that when unfolded, a central portion of the face mask (100) is longer than longitudinal edges of the mask (100). Thus, the face mask (100) blocks an entry of undesired impurities into the nose and mouth of the user from the front, while simplifying storage of the face mask when not in use.

This 2-dimensional configuration is easy and cost efficient to bulk manufacture and can be easily stored in a relatively smaller space. However, when unfolding, the stitched pleated regions at the longitudinal edges of the face mask turn inclines with respect to cheeks of the user, and therefore forming a gap (102) between the longitudinal edges and the cheeks, which in turn allows entry of impurities through those gaps.

Hence, there is still a need in the art for a face mask that eliminates gap formation between side edges thereof and the user's face and which is also simple to manufacture and store.

SUMMARY

The present invention related to a face mask for wearing over the mouth and nose of a user. The mask comprises a flexibly body portion and a fastening means attached to the body portion. The body portion substantially covers a respiratory tract opening e.g., mouth and nostrils, of the user to block an entry of undesired airborne impurities into the respiratory tract opening. When the mask is worn, a front surface of the body portion is exposed to an external atmosphere and a rear surface of the body portion comes in substantial contact with the face. The fastening means holds the body portion against the respiratory tract opening when the mask is worn.

In a preferred embodiment, the body portion includes two or more pleated regions at each of two longitudinal side edges of the body portion and at least one non-pleated region between two adjacent pleated regions, wherein the pleated regions are fastened, preferably by means of sewing, ultrasonic welding and/or gluing. In a preferred embodiment, one of the pleated region overlaps another pleated region when the face mask is in use, such that at least a portion of the overlapped pleated region is hidden behind the overlapping pleated region.

The pleated regions are configured to be horizontally parallel to one another when the face mask is in use, such that the non-pleated region at each longitudinal edge is sandwiched between the corresponding pleated regions. When sandwiched between the pleated regions, a front surface of each non-pleated region is in substantial contact with a front surface of a corresponding the pleated region that is above the non-pleated region and a rear surface of each non-pleated region is in substantial contact with a rear surface of a corresponding pleated region that is below the non-pleated region. The body portion includes multiple layers of flexible material, wherein the layers are stacked together and edges of each layer are fastened to corresponding edges of adjacent layers. Preferably, the edges of each layer are fastened to the corresponding edges of the adjacent layers by means of sewing, ultrasonic welding and/or gluing.

Furthermore, the body portion includes one or more filtering means impermeable to the impurities. Preferably, the filtering means is formed as one of the stacked layers. Alternatively, the filtering means may be in the form of a filtering inhalation and/or exhalation valve attached to one or more of the stacked layers. Additionally, one or more deformable members are embedded between the layers.

Since the non-pleated region are sandwiched between the corresponding pleated regions when the face mask is unfolded for use, the longitudinal side edges of the body portion are made into an arc-like configuration, which in turn keeps the pleated regions and the non-pleated regions to be parallel to a surface of the user's cheek, while allowing the rear surface of the longitudinal side edges to be in substantial contact with the user's face. By this way, the present invention eliminates chances of forming a gap between the side edges and the user's face. Furthermore, due to its two-dimensional structure, the face mask is simple and cost-effective to manufacture in bulk and also can be stored easily in a relatively smaller space.

BRIEF DESCRIPTION OF THE ACCOMPANYING DRAWINGS

In the figures, similar components and/or features may have the same reference numerals. Further, various components of the same type may be distinguished by following the reference numerals with a second numeral that distinguishes among the similar components. If only the first reference numeral is used in the specification, the description is applicable to any one of the similar components having the same first reference numeral irrespective of the second reference numeral.

DETAILED DESCRIPTION

In accordance with the present disclosure, there is provided a face mask for wearing over mouth and nose of a user, which will now be described with reference to the embodiments shown in the accompanying drawings. The embodiments do not limit the scope and ambit of the disclosure. The description relates purely to the embodiments and suggested applications thereof.

The embodiments herein and the various features and advantageous details thereof are explained with reference to the non-limiting embodiment in the following description. Descriptions of well-known components and processes are omitted so as to not unnecessarily obscure the embodiments herein. The examples used herein are intended merely to facilitate an understanding of ways in which the embodiments herein may be practiced and to further enable those of skill in the art to practice the embodiment herein. Accordingly, the description should not be construed as limiting the scope of the embodiment herein.

The description hereinafter, of the specific embodiment will so fully reveal the general nature of the embodiments herein that others can, by applying current knowledge, readily modify or adapt or perform both for various applications such specific embodiment without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Figure 1:
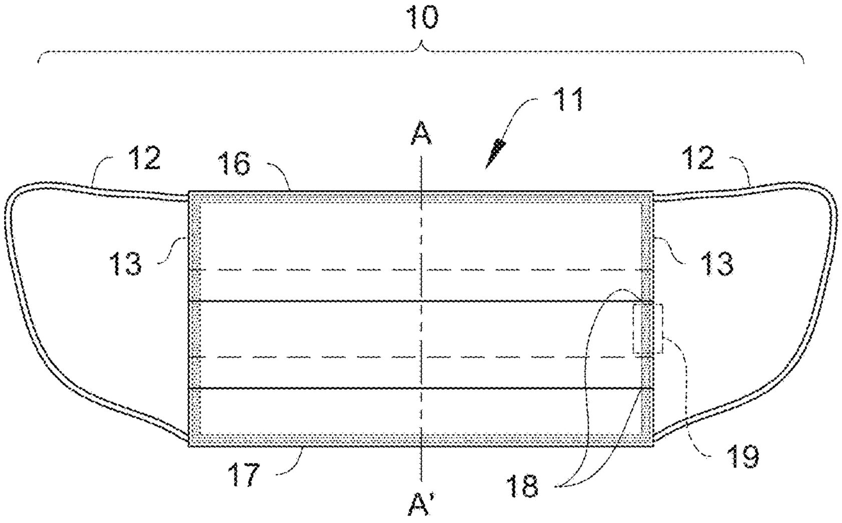
FIG. 1 shows a front view of the face mask in a folded condition, in accordance with an exemplary embodiment of the present invention.
Figure 1A:
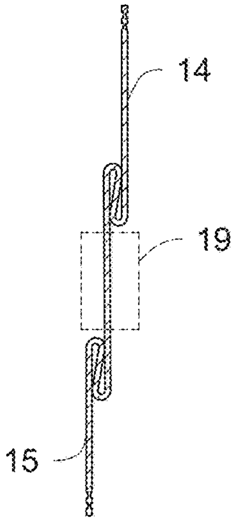
FIG. 1A shows a cross sectional view of the face mask along A-A' in FIG. 1.

FIG. 1 shows a front view of the face mask, in accordance with an exemplary embodiment of the present invention. The face mask (10) comprises a flexible body portion (11) and one or more fastening means (12) attached to the body portion. When worn over mouth and nose of the user, the body portion (11) is configured to substantially cover a respiratory tract opening e.g., mouth and nostrils, of the user to block an entry of any undesired airborne impurities into the respiratory tract opening. Preferably, the impurities include but are not limited to biological impurities such as bacteria, virus and other germs, pollutant particles such as carbon particles, ash, particles, and/or any other airborne particles that may be harmful to the user's health.

The body portion (11) includes a front surface (14), a rear surface (15) and a pair of longitudinal side edges (13) for attaching the fastening means. When the mask (10) is worn, the front surface (14) is exposed to an external atmosphere and a rear surface (15) comes in substantial contact with the face. The body portion (11) includes a top edge (16) and a bottom edge (17) which comes in contact with the user's nose and chin area, respectively, when the mask (10) is worn.

Furthermore, the body portion (11) is constructed from two or more layers of flexible material such as sheets of fabric and the like. Preferably, multiple layers are stacked together and edges of each layer are fastened to corresponding edges of adjacent layers so as to form a single body, wherein the outermost layers act as the front surface (14) and the rear surface (15). The edges of each layer are fastened to corresponding edges of adjacent layers by means of sewing, ultrasonic welding and/or gluing. In a preferred embodiment, the body portion (11) includes a layer of 25 GSM (grams per square meter) Meltblown Non Woven Fabric Bacterial Filtration Efficiency (BFE) material sandwiched between two layers of 25 GSM hydrophobic spunbound nonwoven fabric material.

Figure 2:
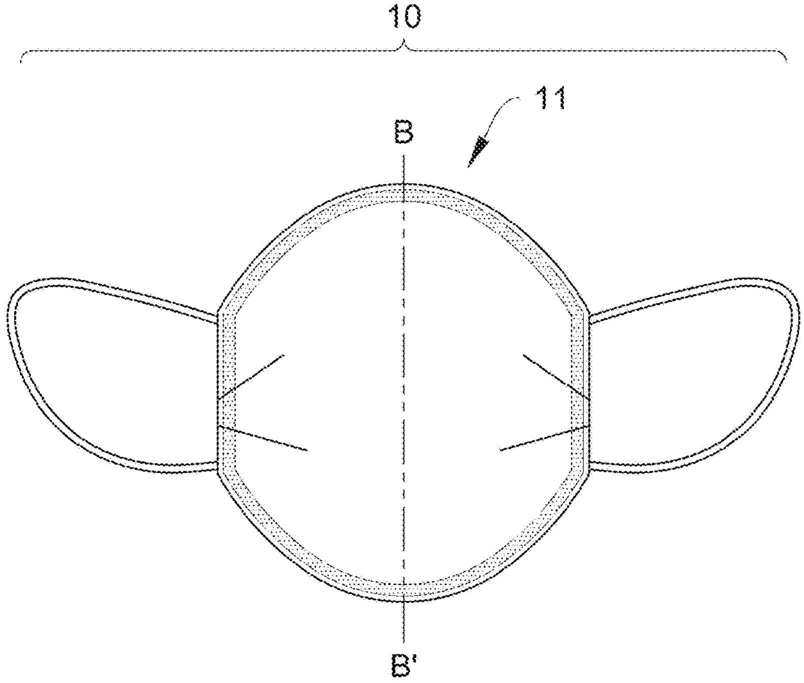
FIG. 2 shows a front view of the face mask in an unfolded condition, in accordance with an exemplary embodiment of the present invention.
Figure 2A:
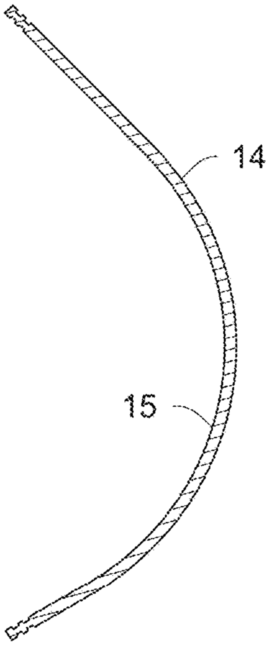
FIG. 2A shows a cross sectional view of the face mask along B-B' in FIG. 2.
Figure 3:
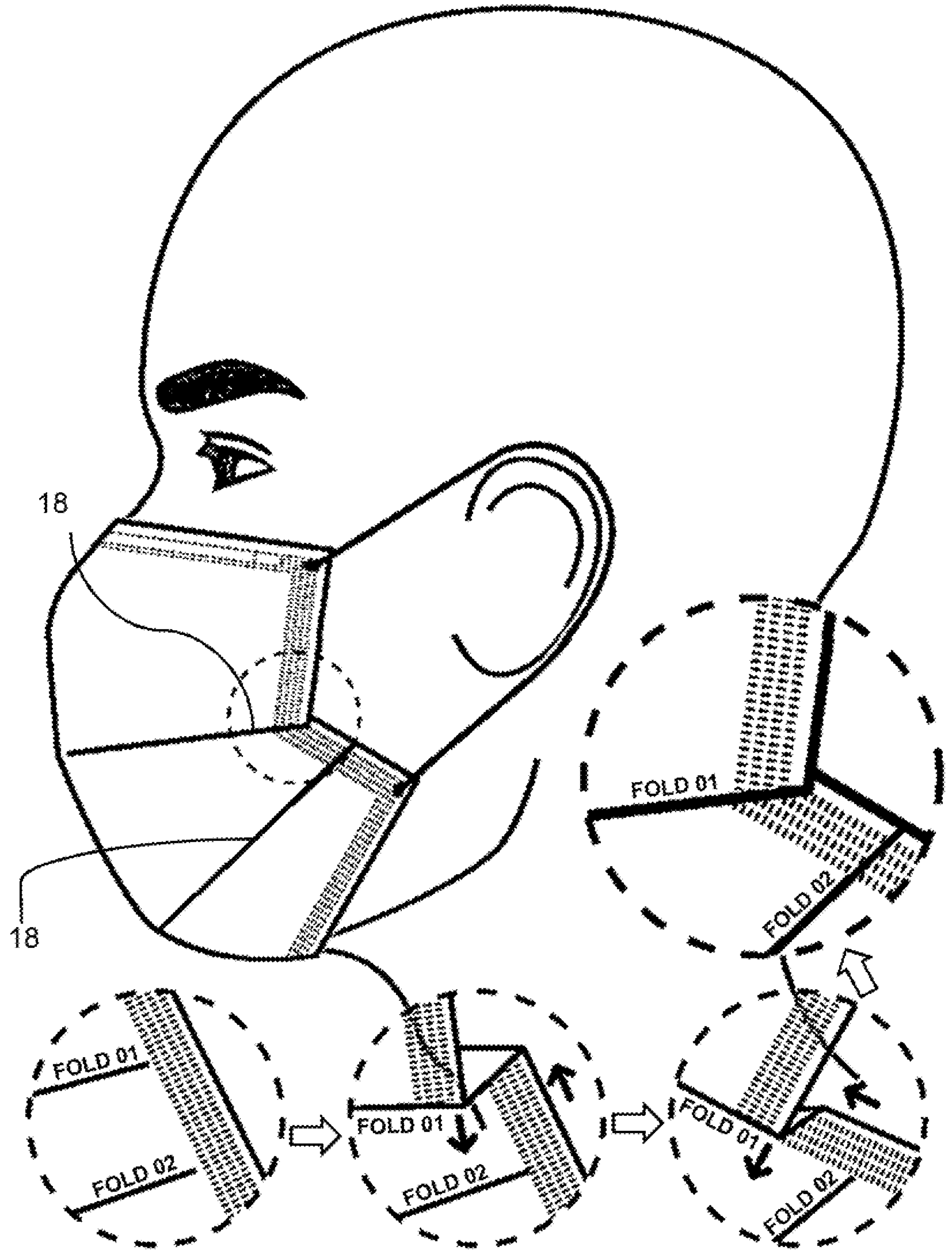
FIG. 3 shows a left-side view of the face mask worn over mouth and nose of a user, in accordance with an exemplary embodiment of the present invention.

The body portion (11) includes two or more pleated regions (18) at each longitudinal side edge (13) and a non-pleated region (19) between two adjacent pleated regions (18). Preferably, a width of the non-pleated region (19) ranges between 3-7 millimeters (mm). The pleated regions (18) are fastened, preferably by means of sewing, ultrasonic welding and/or gluing, such that a pleat extends between each pleated region (18) at one longitudinal side edge (13) and the corresponding pleated region (18) at the opposite longitudinal side edge (13). Since the pleated regions (18) at the longitudinal side edges (13) are fastened, a center portion of each pleat is allowed to be unfolded while the pleated regions (18) at the longitudinal side edges (13) permanently stay in a folded condition, as shown in FIGS. 2 & 3. Furthermore, the non-pleated region (19) extends between the longitudinal side edges (13) and separates the adjacent pleats from one another.

Figure 4:
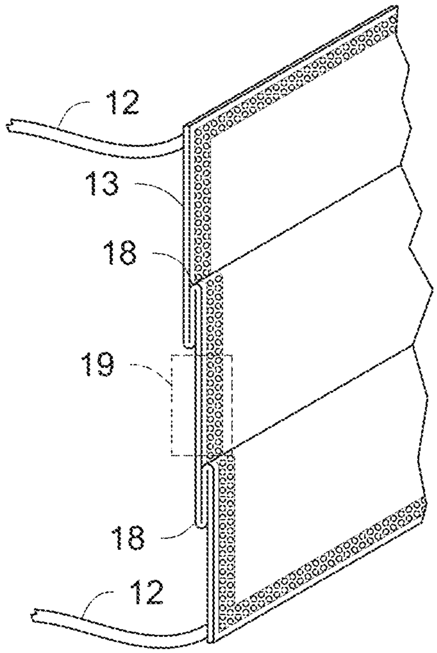
FIG. 4 shows a perspective view of a vertical side edge of the face mask immediately adjacent to the edge or site of fastening in a folded condition, in accordance with an exemplary embodiment of the present invention.
Figure 5:
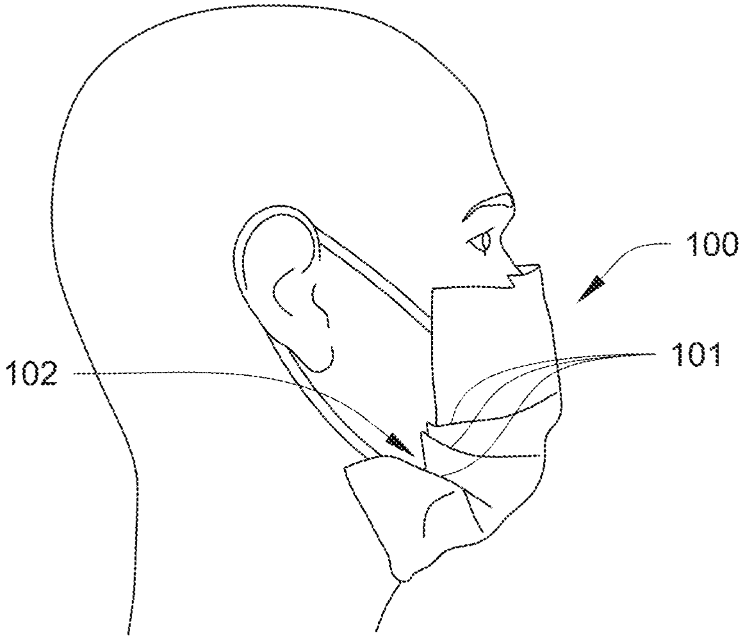
FIGURE 5 (PRIOR ART)
FIG. 5 shows a right-side view of a conventional face mask worn over mouth and nose of a user.

The pleated regions (18) are configured to be vertically parallel to one another, as shown in FIG. 4, when the face mask (10) is not in use. When the face mask (10) is in use, one of the pleated regions (18) overlaps the non-pleated region (19), in which this overlapping feature allows the rear surface of the longitudinal side edges to be in substantial contact with the user's face, as shown in FIG. 3, ensuring a tight abutment against the user's cheek and prevent any openings or spaces that could allow impurities to enter. When the face mask (10) is in use, one of the pleated regions (18) overlaps the non-pleated region (19), such that at least a portion of the overlapped non-pleated region (19) is hidden behind the overlapping pleated region (18), and therefore the front surface (14) of the overlapping pleated region (18) is completely visible from outside, while the hidden portion of the overlapped non-pleated region (19) is not visible from the outside, as shown in FIG. 3.

While in use, the longitudinal side edges (13) of the body portion (11) are made into an arc-like configuration, and enable the pleated regions (18) and the non-pleated regions (19) to be parallel to a surface of the user's cheek, as shown in FIG. 3, and allowing the rear surface of the longitudinal side edges (13) to be in substantial contact with the user's face, which in turn eliminates chances of forming a gap between the side edges (13). Thus, the present invention is capable of improving protection against airborne impurities. Furthermore, due to its two-dimensional structure, the face mask (10) is simple and cost-effective to manufacture in bulk and also can be stored easily in a relatively smaller space.

The body portion (11) also includes one or more filtering means impermeable to the impurities, preferably the filtering means is any N95 compliant filtering medium. In a preferred embodiment, one or more of the layers in the body portion (11) function as the filtering means. Alternatively, a separate filtering device such as a filtering exhalation/inhalation valve is embedded to the body portion (11). Optionally, one or more deformable members (not shown) are embedded between the layers to allow the top edge (16), the longitudinal side edges (13) and/or the bottom edge (17) of the body portion (11) to be selectively deformed to conform with a contour of corresponding portion of the user's face.

Preferably, the fastening means (12) includes a string or strap made of fabric material and/or elastomeric material, wherein one or both ends of the string are permanently attached to one or two of the longitudinal side edges (13) of the body portion (11). For example, as shown in FIGS. 1, 2 & 3, both ends of each string are permanently attached to one of the longitudinal side edges (13) of the body portion (11) to form a loop that goes around an earlobe of the user when worn. Alternatively, the two ends of each string are attached to the two longitudinal side edges (13) of the body portion to form a loop that goes around a back of the user's head when worn.

Furthermore, the fastening means (12) may include one or more pairs of strings, wherein the strings of each pair are permanently attached to opposite longitudinal side edges (13) of the body portion (11), such that each string forms a loop when fastened with another string attached to the opposite longitudinal side edge (13). Each string/strap is fastened to a corresponding string/strap at the opposite longitudinal side edge (13) by any conventional fastening means including but not limited to knotting, hook-loop fastener, etc.

Even though the above embodiments show the face mask (11) in a rectangular shape under the folded condition, it is to be understood that the face mask (11) also be realized in any other two-dimensional shapes under the folded condition, wherein the longitudinal side edges are substantially linear. Furthermore, it is to be understood that the figures used herewith are merely for illustration purpose and the actual dimensions may vary as per manufacturing requirements.

The terminology used herein is for the purpose of describing particular example embodiments only and is not intended to be limiting. As used herein, the singular forms "a", "an" and "the" may be intended to include the plural forms as well, unless the context clearly indicates otherwise.

The terms "comprises," "comprising," "including," and "having," are inclusive and therefore specify the presence of stated features, integers, steps, operations, elements, or components, but do not preclude the presence or addition of one or more other features, integers, steps, operations, elements, components, or groups thereof.

The use of the expression "at least" or "at least one" suggests the use of one or more elements, as the use may be in one of the embodiments to achieve one or more of the desired objects or results.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The invention claimed is:

1. A face mask comprising:

i. a flexible body portion for covering a respiratory tract opening of a user when in use, wherein said body portion is completely fastened along a top edge, a bottom edge and two longitudinal side edges of the body portion; and ii. at least one fastening means attached to said body portion for holding said body portion against a face of the user when said face mask is in use, wherein said body portion includes:

two pleated regions, in which, a first pleated region is connected to the top edge; a second pleated region is connected to the bottom edge;

a non-pleated region between the first pleated region and the second pleated region, wherein each of the first pleated region and the second pleated region is a three-layer thick region formed by folding portions of the body portion upon itself and back again into a Z-shape that is fastened at each longitudinal edge, and the non-pleated region is a one-layer-thick flexible and deformable region configured such that a rear portion of the first pleated region is connected to a top portion of the non-pleated region and a front portion of the second pleated region is connected to a bottom portion of the non-pleated region; and wherein, when the face mask is in use, the first pleated region, at the longitudinal side edges, overlaps at least a portion of front portion of the non-pleated region, such that a portion of the front portion of the non-pleated region that is overlapped is hidden and not visible behind the first pleated region that overlaps the at least portion of the front portion of the non-pleated region, causing each of the longitudinal side edge to transition from a straight line into a V-shape with its vertex pointed to the center of the mask body, such that rear surfaces of each longitudinal side edges contact with a cheek of the user in a tight abutment from the top edge to the bottom edge.

2. The face mask of claim 1, wherein said body portion includes multiple layers of flexible material, wherein said layers are stacked together and the longitudinal side edges of each layer are fastened to corresponding edges of adjacent layers.

3. The face mask of claim 2, wherein said edges of each layer are fastened to corresponding edges of adjacent layers by means sewing, ultrasonic welding or gluing.

4. The face mask of claim 1, wherein said body portion includes at least one filtering means impermeable to impurities.

5. The face mask of claim 1, wherein each pleated region is fastened by means of sewing, ultrasonic welding or gluing.

6. The face mask of claim 1, wherein a width of said non-pleated region ranges between 3-7 millimeters.

* * * * *